(12) United States Patent
Gawthrop

(10) Patent No.: US 11,168,897 B2
(45) Date of Patent: Nov. 9, 2021

(54) WATER PRECONDITIONER SYSTEM

(71) Applicant: Prexcel Solutions, Inc., Troy, MI (US)

(72) Inventor: Peter Gawthrop, Troy, MI (US)

(73) Assignee: Prexcel Solutions, Inc., Troy, MI (US)

( * ) Notice: Subject to any disclaimer, the term of this patent is extended or adjusted under 35 U.S.C. 154(b) by 0 days.

(21) Appl. No.: 17/269,109

(22) PCT Filed: Aug. 23, 2019

(86) PCT No.: PCT/US2019/047903
§ 371 (c)(1),
(2) Date: Feb. 17, 2021

(87) PCT Pub. No.: WO2020/041700
PCT Pub. Date: Feb. 27, 2020

(65) Prior Publication Data
US 2021/0247076 A1     Aug. 12, 2021

Related U.S. Application Data

(60) Provisional application No. 62/844,934, filed on May 8, 2019, provisional application No. 62/722,414, filed on Aug. 24, 2018.

(51) Int. Cl.
*F24D 19/10* (2006.01)
*F24D 17/00* (2006.01)
(Continued)

(52) U.S. Cl.
CPC ............ *F24D 19/1051* (2013.01); *F24D 3/02* (2013.01); *F24D 17/0078* (2013.01);
(Continued)

(58) Field of Classification Search
CPC ............ F24D 19/1051; F24D 19/1015; F24D 17/0078; F24D 2220/0221;
(Continued)

(56) References Cited

U.S. PATENT DOCUMENTS 3,847,209 A    11/1974  Mascall
4,696,428 A     9/1987  Shakalis
(Continued)

FOREIGN PATENT DOCUMENTS

BR         8702088 A    11/1988
CN       107061787 A     8/2017
(Continued)

OTHER PUBLICATIONS

International Search Report and Written Opinion for Application No. PCT/US19/47903 dated Nov. 15, 2019, 8 pages.
(Continued)

*Primary Examiner* — Steven B Mcallister
*Assistant Examiner* — Daniel E. Namay
(74) *Attorney, Agent, or Firm* — Howard & Howard Attorneys PLLC

(57) ABSTRACT

A water preconditioner system comprising a user interface for manually or automatically receiving inputs from a user, a mixing assembly including a plurality of control valves coupled to hot and cold water supply lines, and a controller in communication with the plurality of control valves and the user interface for controlling the operation of the system. The controller is configured to operate in a plurality of modes to precondition the water to one of a desired preset water dispensing temperature or a target temperature different from the desired preset water dispensing temperature.

13 Claims, 7 Drawing Sheets

(51) Int. Cl.
*F24D 3/02* (2006.01)
*F24H 1/18* (2006.01)
*F24H 1/52* (2006.01)
*F24D 3/10* (2006.01)
*F24D 3/08* (2006.01)

(52) U.S. Cl.
CPC ......... *F24D 19/1015* (2013.01); *F24H 1/186* (2013.01); *F24D 3/08* (2013.01); *F24D 3/10* (2013.01); *F24D 2220/0221* (2013.01); *F24D 2220/0271* (2013.01); *F24H 1/52* (2013.01)

(58) Field of Classification Search
CPC ...... F24D 2220/0271; F24D 3/02; F24D 3/08; F24D 3/10; F24H 1/52; F24H 1/207; F24H 1/186; F24H 1/205; F24H 1/406; F24H 9/2007
USPC ..... 237/8 A, 2 A, 8 D; 122/15.1, 18.1, 406.1
See application file for complete search history.

(56) References Cited

U.S. PATENT DOCUMENTS

| | | | |
|---|---|---|---|
| 4,750,472 A | 6/1988 | Fazekas | |
| 4,854,498 A | 8/1989 | Stayton | |
| 4,936,289 A | 6/1990 | Peterson | |
| 4,969,598 A | 11/1990 | Garris | |
| 5,050,062 A | 9/1991 | Hass | |
| 5,511,579 A | 4/1996 | Price | |
| 5,829,467 A | 11/1998 | Spicher | |
| 5,829,475 A | 11/1998 | Acker | |
| 5,979,776 A | 11/1999 | Williams | |
| 6,227,235 B1 | 5/2001 | Laing et al. | |
| 6,250,558 B1 | 6/2001 | Dogre Cuevas | |
| 6,629,645 B2 | 10/2003 | Mountford et al. | |
| 6,705,534 B1 | 3/2004 | Mueller | |
| 6,892,952 B2 | 5/2005 | Chang et al. | |
| 7,036,520 B2 | 5/2006 | Pearson, Jr. | |
| 7,077,155 B2 | 7/2006 | Giammaria | |
| 7,832,421 B2 | 11/2010 | Laing | |
| 8,070,072 B2 | 12/2011 | Lin | |
| 8,231,064 B2 | 7/2012 | Lum et al. | |
| 8,291,930 B2 | 10/2012 | Lee | |
| 8,594,853 B2 | 11/2013 | McNamara et al. | |
| 8,807,521 B2 | 8/2014 | Dunki-Jacobs et al. | |
| 8,910,880 B2 * | 12/2014 | Farrell | F24H 1/52 |
| | | | 237/8 A |
| 8,934,763 B2 | 1/2015 | Laing | |
| 9,285,127 B2 | 3/2016 | Beckman | |
| 9,353,956 B2 | 5/2016 | Halff | |
| 9,989,265 B2 | 6/2018 | Halff | |
| 11,047,118 B2 * | 6/2021 | Ridell | E03C 1/041 |
| 11,060,763 B2 * | 7/2021 | van Houten | G05B 15/02 |
| 2007/0246550 A1 | 10/2007 | Rodenbeck et al. | |
| 2009/0090310 A1 * | 4/2009 | Farrell | F24H 1/34 |
| | | | 122/20 A |
| 2009/0179079 A1 * | 7/2009 | Ruijven | F24H 1/06 |
| | | | 237/12.3 B |
| 2009/0249582 A1 * | 10/2009 | Van Doorn | D01G 99/005 |
| | | | 19/66 CC |
| 2009/0266426 A1 * | 10/2009 | Lee | F24D 17/0078 |
| | | | 137/337 |
| 2011/0203788 A1 * | 8/2011 | Kato | F24D 19/1012 |
| | | | 165/292 |
| 2015/0063793 A1 * | 3/2015 | Zeller | F24H 1/185 |
| | | | 392/441 |
| 2016/0266588 A1 * | 9/2016 | Ward | G05D 23/134 |
| 2016/0266589 A1 * | 9/2016 | Ward | F24D 17/0094 |
| 2017/0003153 A1 * | 1/2017 | Ward | F24D 19/1051 |
| 2017/0122458 A1 * | 5/2017 | Farris | G05D 23/1393 |
| 2017/0356660 A1 * | 12/2017 | Branecky | F24H 1/0018 |
| 2018/0314275 A1 * | 11/2018 | Aoki | G05D 23/1333 |
| 2019/0154303 A1 * | 5/2019 | Kitano | F24H 1/52 |

FOREIGN PATENT DOCUMENTS

| | | | | |
|---|---|---|---|---|
| DE | 3925590 A1 | 2/1991 | | |
| EP | 3029208 A1 | 6/2016 | | |
| GB | 236836 A | * 7/1925 | ......... | F24D 19/1051 |
| GB | 935873 A | * 9/1963 | ............... | F24D 3/08 |
| JP | 2001141299 A | 5/2001 | | |
| KR | 20090122575 A | * 12/2009 | ......... | F24D 19/1066 |
| WO | 02/12760 A1 | 2/2002 | | |

OTHER PUBLICATIONS

English language abstract and machine-assisted English translation for CN107061787 extracted from espacenet.com database on Jun. 23, 2021, 15 ages.

* cited by examiner

WATER PRECONDITIONER SYSTEM

CROSS-REFERENCE TO RELATED APPLICATIONS

This application is the National Stage of International Patent Application No. PCT/US2019/047903, filed on Aug. 23, 2019, which claims priority to and all the advantages of U.S. Provisional Application No. 62/844,934, filed on May 8, 2019, and U.S. Provisional Application No. 62/722,414, filed on Aug. 24, 2018, the contents of which are incorporated by reference.

BACKGROUND

Typically, a user enters a shower or bathtub with no knowledge about the temperature of water coming out. This leads to the user potentially being burned if the water is too hot or frozen if the water is too cold. Additionally, the user must take time to adjust the water temperature. Conventionally, the control of water temperature is accomplished by manually adjusting the flow rates of hot and cold water back and forth, so that the mixture achieves a desired temperature. Such a process conventionally requires much trial and error in adjusting the water temperature before the user even able to start showering or bathing.

This adjustment process not only wastes the user's time and potentially could harm the user but also wastes liters of water and energy cooling and/or heating the water. In just the United States, about 1.1 billion liters of water is wasted every day in attempt to achieve the desired water temperature. In addition, during the adjustment process, it requires energy to reheat the water. Consequently, reducing water usage not only saves the water itself, but also conserves valuable energy and resulting energy costs.

The advantages of any system that conserves water, energy, and time is paramount. The need for water preconditioner system, with features capable of being configured to meet one, more or all of the aforementioned challenges is desired.

DETAILED DESCRIPTION

Figure 1:
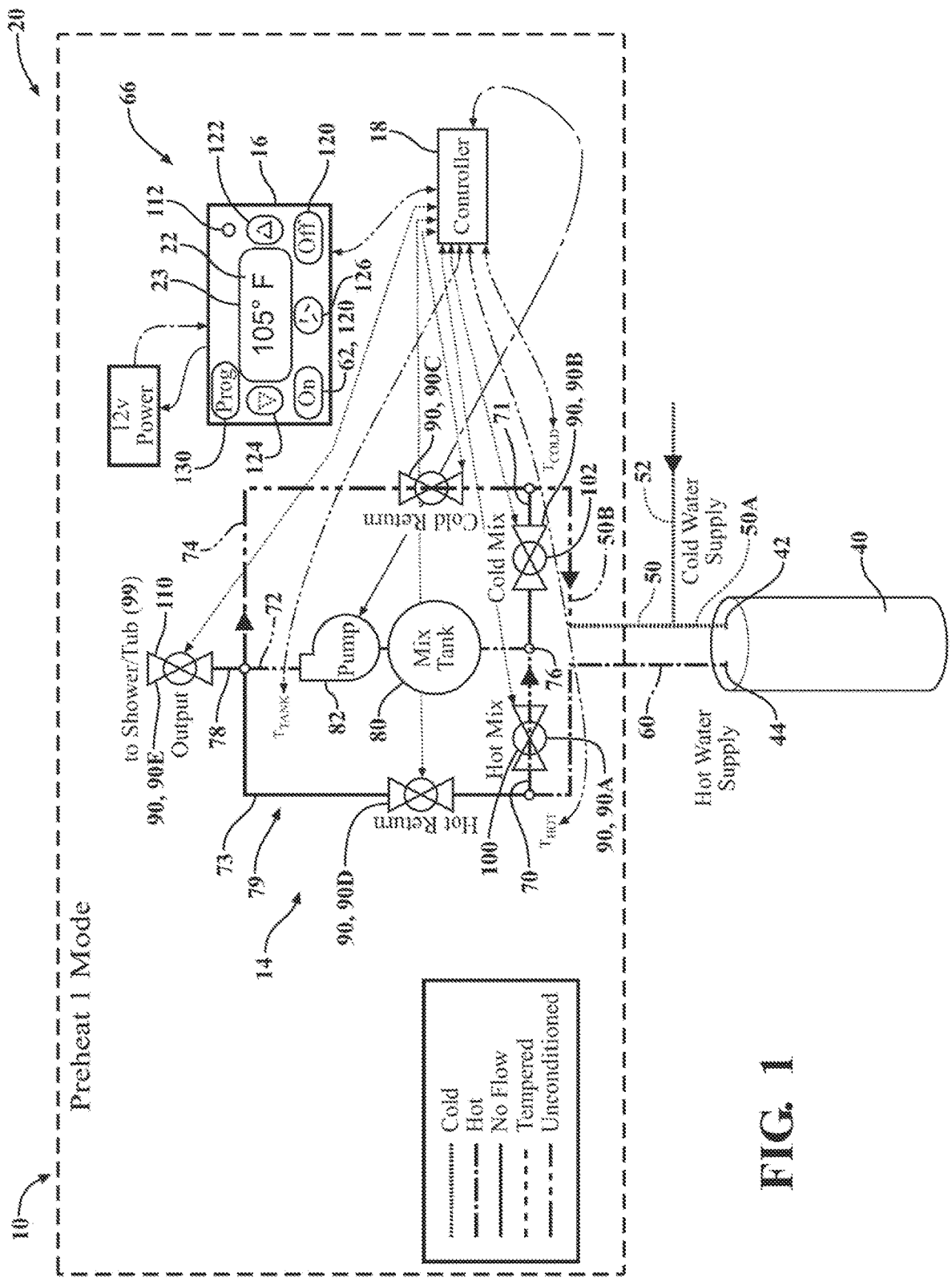
FIG. 1 is a diagrammatic representation of the water preconditioner system in a first pre-heat mode according to one example.

The embodiments below are described with reference to the drawings. The relationship and functioning of the various elements of the embodiments are better understood by the following detailed description. However, the embodiments as described below are by way of example only, and the invention is not limited to the embodiments illustrated in the drawings. It should also be understood that the drawings are not drawn to scale and, in certain instances, details which are not necessary for an understanding of the embodiments have been omitted.

As generally shown throughout FIGS. 1-6, a diagrammatic representation of a water preconditioner water preconditioner system 10 is shown for preconditioning water to a desired or preset water temperature 22 before water flows out of a water outlet such as a shower head, faucet or the like. It will be appreciated that the preset water temperature 22 may be any degree of temperature of water configurable by the user (shown as 105 degrees Fahrenheit in each of FIGS. 1-6).

Figures 7, 8:
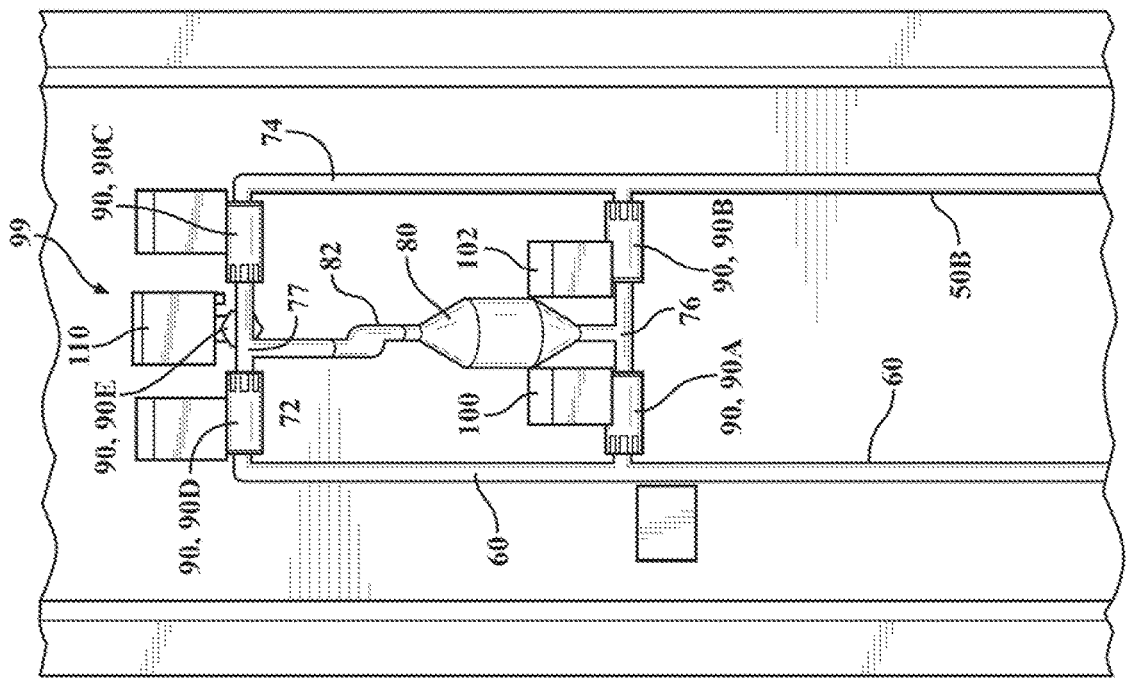
FIG. 7 is a shower-side view is an exemplary water preconditioner system installed into a shower installation with one water outlet, according to one example.
FIG. 8 is a wall-side view of the exemplary water preconditioner system of FIG. 7.

The water preconditioner system 10 may be installed in any type of showering and/or bathing installations. For example, as shown in FIGS. 7 and 8, the water preconditioner system 10 is installed in a shower installation 12 having one water outlet (shown in FIGS. 1-6 as reference numeral 99, and shown in FIG. 7 as a shower head 13). In another example, the water preconditioner system 10 may be installed in a shower installation 12 having multiple water outlets (not shown). It will be appreciated that the water preconditioner system 10 may be installed in a shower 12 comprising any number of water outlets. For simplicity and exemplary purposes, as described herein, the water preconditioner system 10 is installed in a shower 12 having one water outlet in the form of a shower head 13 as shown in FIGS. 7 and 8 unless otherwise stated. It will further be appreciated that the water preconditioner system 10 may be installed in a sink, bathtub, hot tub, or any similar apparatuses.

The systems and methods described herein provide a water preconditioner system 10 for controlling water flow and water temperature, particularly a water flow control system for preheating or precooling and recirculating water to reduce water consumption. FIGS. 1-6 depict an exemplary water preconditioner system 10 which is configured for use, for example, in the shower 12 as shown in FIGS. 7 and 8.

Referring to FIGS. 1-6, the water preconditioner system 10 includes a mixing assembly 14, having a plurality of control valves 90, a user interface 16 for manually or automatically receiving inputs from a user and a controller 18 in communication with the control valves and the user interface 16 for controlling the operation of the water preconditioner system 10 in a plurality of modes.

As will be described in detail further below, the controller 18 is configured to operate the water preconditioner system 10 in a first mode 20 (i.e., Preheat Mode 1) and a second mode 24 (i.e., Preheat Mode 2) configurable by the user through the user interface 16 to preheat the water in the mixing assembly 14 to the first preset water temperature 22. The controller 18 is further configured to operate the water preconditioner system 10 in a third mode 28 (i.e., Precool Mode 1) followed by the second mode 24 configurable by the user through the user interface 16 to precool the water in the mixing assembly 14 to the first preset temperature 22. In addition, the controller 18 is further configured to operate the water preconditioner 10 in a fourth mode 32 (i.e., maintain mode) to maintain the water in the mixing assembly 14 at the respective first preset water temperature 22. Yet still further, the controller 18 is further configured to operate the water preconditioner 10 in a fifth mode 34 (i.e., water dispensing mode, or play mode) to regulate the water flow at the first preset water temperature 22 out of the shower head 13. Finally, the controller 18 is also configured to operate the water preconditioner system 10 in an off mode 38. It will be appreciated that the system 10 may include any number of controllers, shown herein as a single controller 18.

The water preconditioning system 10 includes a hot water tank 40 having a water inlet 42 and a water outlet 44. A cold water return line 50 is fluidically coupled to the water inlet 42 of the hot water mixing tank 40, while a hot water supply line 60 is fluidically coupled to the water outlet 44 of the hot water tank 40. The cold water return line 50 provides cold water to the hot water tank 40, where the cold water is heated.

As used herein, the term "fluidically coupled", or "fluid communication", is defined as a path wherein water may flow between components, either directly or through one or more intermediate components. In other words, fluid communication may entail more than the two components mentioned. For example, the cold water return line 50 and the hot water supply line 60 are fluidically coupled or otherwise are in "fluid communication" with each other, even though, in one example, the hot water tank 40 is contained between the cold water return line 50 and the hot water supply line 60. It will be appreciated that any components of the system 10 through which water flows are fluidically coupled to each other or otherwise in fluid communication, unless specifically stated.

The cold water return line 50 is fluidically coupled to a cold water supply line 52. In particular, the cold water supply line 52 supplies cold water to a first portion 50A of cold water return line 50 for introduction to the hot water holding tank 40 through the water inlet 42. The cold water supply line 52 also supplies cold water to a second portion 50B of the cold water return line 50 for introduction to the mixing assembly 14 when the water preconditioning system 10 is operating in the third mode 28, the fourth mode 32 or the fifth mode 34 as will be described further below. The second portion 50B of the cold water return line 50 returns water from the mixing assembly 14 to the hot water tank 40 when the water preconditioning system 10 is operating in the first mode 20 or the second mode 24, as will also be described further below.

The heated water is removed from the hot water tank 40 via the hot water supply line 60 and provided to the mixing assembly 14 for use when the water preconditioning system 10 is operating in the first mode 20, the second mode 24, the third mode 28, the fourth mode 32, or the fifth mode 34, as will also be described in further detail below.

The water preconditioning system 10, as noted above, includes a mixing assembly 14. The mixing assembly 14 includes a hot water inlet line 70 and a hot water return line 73 fluidically connected to the hot water supply line 60. The mixing assembly 14 also includes a cold water inlet line 71 and a mix assembly cold water return line 74 fluidically connected to the second portion 50B of the cold water return line 50. A central water line 72 fluidically connects to and extends from the intersection 76 of the hot water inlet line 70 and cold water inlet line 71 at one end and fluidically connects to and extend from intersection 77 of the hot water return line 73 and mix assembly return line 74 at its opposite end. A water outlet line 78 fluidically coupled to the water outlet, e.g. shower head 13, and is also fluidically coupled to the central water line 72, the hot water return line 73 and mix assembly return line 74 at the intersection 77 to complete the fluid circuit 79 within the mixing assembly 14.

The mixing assembly 14 also includes a mixing tank 80 and a pump 82 fluidically coupled to the central water line 72 between the intersections 76, 77. The mixing assembly 14 also includes a series of two-way control valves 90 positioned within the fluid circuit 79 that control the flow of water through each of the lines 70, 71, 72, 73, 74, and 78. Each of the control valves 90 are operable between a closed and open position to regulate the flow of water. In particular, a hot mix valve 90A is fluidically coupled to the hot water inlet line 70, a cold mix valve 90B is fluidically coupled to the cold water inlet line 71, a cold return valve 90C is fluidically coupled to the mix assembly return line 74, and a hot return valve 90D is fluidically coupled to the hot water return line 73. Still further, a water outlet valve 90E may be fluidically coupled to the water outlet line 78.

Additionally, or alternatively, as shown in FIG. 8, the water outlet valve 90E may comprise two control valves: a release control valve and a return control valve. In this example, the release control valve may be the water outlet 99. Further, the return control valve may be configured to recirculate the water. It will be appreciated that the return control valve may be interchangeable with a mechanical check valve.

Additionally, the water preconditioner system 10 and/or the mixing assembly 14 may further comprise a plurality of different sensors. For example, the mixing assembly 14 may comprise any number of temperature sensors. In one configuration, the mixing assembly 14 includes first temperature sensor 100 coupled to the hot mix valve 90A, a second temperature sensor 102 coupled to the cold mix valve 90B, a third temperature sensor 110 coupled to the water outlet valve 90E. The temperature sensors are configured to sense the temperature of water flowing through the control valves and mixing tank. It will be appreciated that the water preconditioner system 10 may also include any number of additional temperature sensors (in in addition to the temperature sensors 100, 102, 110) coupled to or separated from the respective positioned at any location of the water preconditioner system 10 or the mixing assembly 14.

In another example, the water preconditioner system 10 includes a proximity sensor 112 for detecting the user. The proximity sensor 112 may detect the position or presence of the user with respect to the sensor, the water outlet valve 90E, the shower 12, and/or the user interface 16. The proximity sensor 112 provides signals indicative of the user's position. Any of a variety of sensors may be used as a proximity sensor 112, including active or passive sensing systems.

The user interface 16 may be connected to, powered by and capable of communicating with the controller 18 and/or the water preconditioner system 10. In addition, the controller 18 may be wirelessly connected with a network and other network aspects capable of delivering information to the user. The user interface 16 may be battery power with an internal battery or may comprise leads to receive power through the controller 18 which receives external power.

The user interface 16 may include any number of control buttons coupled to the controller 18 and a display 23. For example, the user interface 16 includes a control button 120 to switch the system 10 on and off, a temperature increase control button 122 that allows the user to increase the respective preset water temperature 22; a temperature decrease control button 124 that allows the user to decrease the respective preset water temperature 22 which are shown on the display 23; and a start button 126 to initiate water flow.

The user may set the respective preset water temperature 22 using either of the temperature increase or decrease control buttons 122, 124. The increase or decrease control buttons 122, 124 may be pre-programmed to increase/decrease in any increments of degrees of temperature. For example, the user may increase the respective preset water temperature 22 by one degree by pressing the temperature increase control button 122 once. In another example, the user may increase the preset water temperature 22 by an increment of two degrees by pressing the temperature increase control button 122 once. It will be appreciated that the user interface 16 may include any combination of the aforementioned control buttons.

Furthermore, in yet another example, the controller 18, via the user interface 16, may include one or more pre-programmed program buttons (shown as a single program button 130 in FIGS. 1-6) with different preset water dispensing temperatures. In the case where there may be multiple users sharing the shower 12, each user may desire different water temperatures dispensed at the shower head 13. In this example, the user interface 16 may include one program button programmed at the first preset temperature 22, and additional program buttons programmed at differing preset temperatures. Alternatively, the controller 18 may include a single program button that allows the user to preset a number of different desired water temperatures dispensed at the shower head 13, that are each respectively stored into the memory of the controller 18. It will be appreciated that the water preconditioner 10 may include any number of preset temperatures, and any number of corresponding program buttons.

Accordingly, when a particular user wishes to use the shower at one of the preset water dispensing temperatures, the user may use the program button 130 to manually select one of the preset dispensing temperatures.

The controller 18 may also be configured to associate each preset temperature setting with a particular time. Accordingly, when a particular user wishes to use the shower at one of the preset water dispensing temperatures, the user may enter the shower at the preprogramed time.

In the illustrated example, as shown in FIGS. 1-6, the program button 130 has been utilized to preset to the temperature to a first preset temperature 22 (shown as 105 degrees Celsius).

As mentioned above, the water preconditioner system 10 includes the user interface 16 for manually or automatically receiving inputs from the user. For example, the user interface 16 may automatically receive inputs from the user via the proximity sensor 112. In another example, the user interface 16 may manually receive inputs from the user via the increase or decrease control buttons 122, 124 or by selecting the program button 130. It will be appreciated that other methods of receiving inputs from the user may be contemplated.

The flow of water and/or water temperature is controlled using the programmable controller 18, which may be pre-programmed and/or user-programmed, and one or more temperature sensors and/or proximity sensors. Regardless of the type of sensor(s) employed in the system 10 and/or the mixing assembly 14, the sensor(s) may be provided in an electrical communication (wired or wireless) with the controller 18. The systems and methods discussed herein may be applied to systems and methods comprising a plurality of control valves, sensors, and modes. The following examples illustrates various aspects of the water preconditioner system 10. They are not to be construed to limit the claims in any manner whatsoever.

As mentioned above, the controller 18 is configured to receive user inputs from the user interface 16 via the program button 130 and operate in a plurality of modes. Further, the controller 18 may be further configured to compare the temperature sensed by any of the temperature sensors to the preset water temperature. In response to the comparison and/or the user inputs, the controller 18 may operate in any one of the plurality of modes.

Additionally, the user interface 16 may be configured to produce any number of feedbacks based on the controller 18 and/or the user inputs. It will be appreciated that the feedback may be visual, audio, haptic, and/or any combination thereof. For one example, the user interface 16 may be configured to provide a feedback based on the controller 18 comparing the sensed temperature and the preset water temperature. In this example, the user interface 16 may provide a visual feedback such as a blinking light emitting diode (LED). In another example, the user interface 16 may provide an audio feedback in response of a user input such as the user pressing any of the program buttons.

As noted above, the water preconditioning system 10 includes a series of modes that are utilized to control the operation of the system 10 to dispense water through the shower head 13 at a desired temperature. FIGS. 1-6 are diagrammatic representation of the water preconditioner system 10 in the first preheat mode 20 (Preheat Mode 1, FIG. 1), second preheat mode 24 (Preheat Mode 2, FIG. 2), precool mode 28 (Precool Mode, FIG. 3), maintain mode 32 (Maintain Mode, FIG. 4), and water dispensing mode 34, or play mode 34 (Play Mode, FIG. 5).

It will be appreciated that the controller 18 may operate in any one of the preheating/precooling modes 20, 24, 28 in combination with the maintain mode 32 and/or water dispensing mode 34 in any order or manner. For example, in one shower cycle, the controller 18 may operate only in the first preheat mode 20 and then water dispensing mode 34 without operating in the maintain mode 24 before the water dispensing mode 34.

Furthermore, the controller 18 may comprise any suitable signal processing means, computer executable instructions or software modules stored in a non-transitory memory wherein executable steps, instructions, settings or modules may be executed by a processor or the like. Additionally, or alternatively, the controller 18 may comprise a microcontroller, a processor, one or more integrated circuits, logic parts, and the like for enabling the same. The controller 18 may have any suitable configuration for enabling performance of various tasks related to the operation of the water preconditioner system 10, such as those described throughout. The controller 18 may be located at any suitable location within the system 10.

To initiate the controller 18 to operate the water preconditioning system 10, the controller 18 receives a first user input 66 from the user interface 16 indicative of a desired preset water dispensing temperature 22 by pressing the program button 130 and selecting the desired preset temperature 22 (shown as 105 degrees FIGS. 1-6). Additionally, or alternatively, the first user input 66 may be the user pressing the control button 120 to switch the system 10 on followed optionally by pressing the program button 130 and selecting the desired preset temperature 22. Still further, in certain embodiments, the first user input 66 may be the detection of the user with the proximity sensor 112. In another configuration, the initiation of one or more of the desired modes may be pre-programmed. For example, the water preconditioner system 10 may include a timer wherein the user may set the timer to go off at the same time every day and initiate the controller to operate the water preconditioner system.

Once the controller 18 is initiated to operate the water preconditioning system 10, one or more of the temperatures sensors 100, 102, 110 senses the water temperature of the water, such as the first temperature sensor 100 located within or in proximity of the hot mix valve 90A, and sends a signal to the controller 18 corresponding to the sensed temperature. The controller 18 interprets this sent signal and determines whether to operate the water preconditioning system 10 in the first preheat mode 20, the second preheat mode 24, the precool mode 28 (i.e., third mode), the maintain mode 32 (i.e., fourth mode), the water dispensing mode (i.e., fifth mode), or the off mode 38. In further configurations, the controller 18 may also interprets signals sent from any one or more of the other temperature sensors 102 or 100 in combination with the signal sent from the first temperature sensor 100 to determine the operational mode.

The first preheat mode 20 is initiated by the controller 18 when the sensed water temperature at the mixing tank 80 is less that the preset water dispensing temperature 22 and is less than a target temperature. The target temperature refers to a water temperature at the mixing tank 80 that is preset by the controller 18 which is less than the preset water dispensing temperature 22 by a predetermined number of degrees, such as by 5 to 10 degrees Fahrenheit.

During the first preheat mode 20, as shown in FIG. 1 according to one example, the controller 18 toggles the hot mix valve 90A to the open position (corresponding to 100% hot water flow rate through the hot mix valve 90A), allowing hot water flow into the mixing tank 80. At the same time, the controller 18 toggles the cold mix valve 90B to the closed position (0% cold water flow rate through the cold mix valve 90B), allowing no cold water flow into the mixing tank 80. Still further, the controller 18 toggles the water outlet valve 90E in a bypass position, the cold water return valve 90C to an open position, and the hot water return valve 90D to a closed position. In this example, when the water outlet valve 90E is in the bypass position, the water flow from the outlet of the pump 82 and is directed through the open cold water return valve 90C, the second portion 50B and first portion 50A of the cold water return line 50, and the fluid inlet 42 of the hot water tank 40. The first preheat mode 20 continues until the water temperature circulating through the mixing tank 80 reaches a target temperature as sensed by one or more of the temperature sensors 100, 102, 110. Once the target temperature is reached, the controller 18 is configured to operate the water preconditioner system 10 in the second preheat mode 24.

Figure 2:
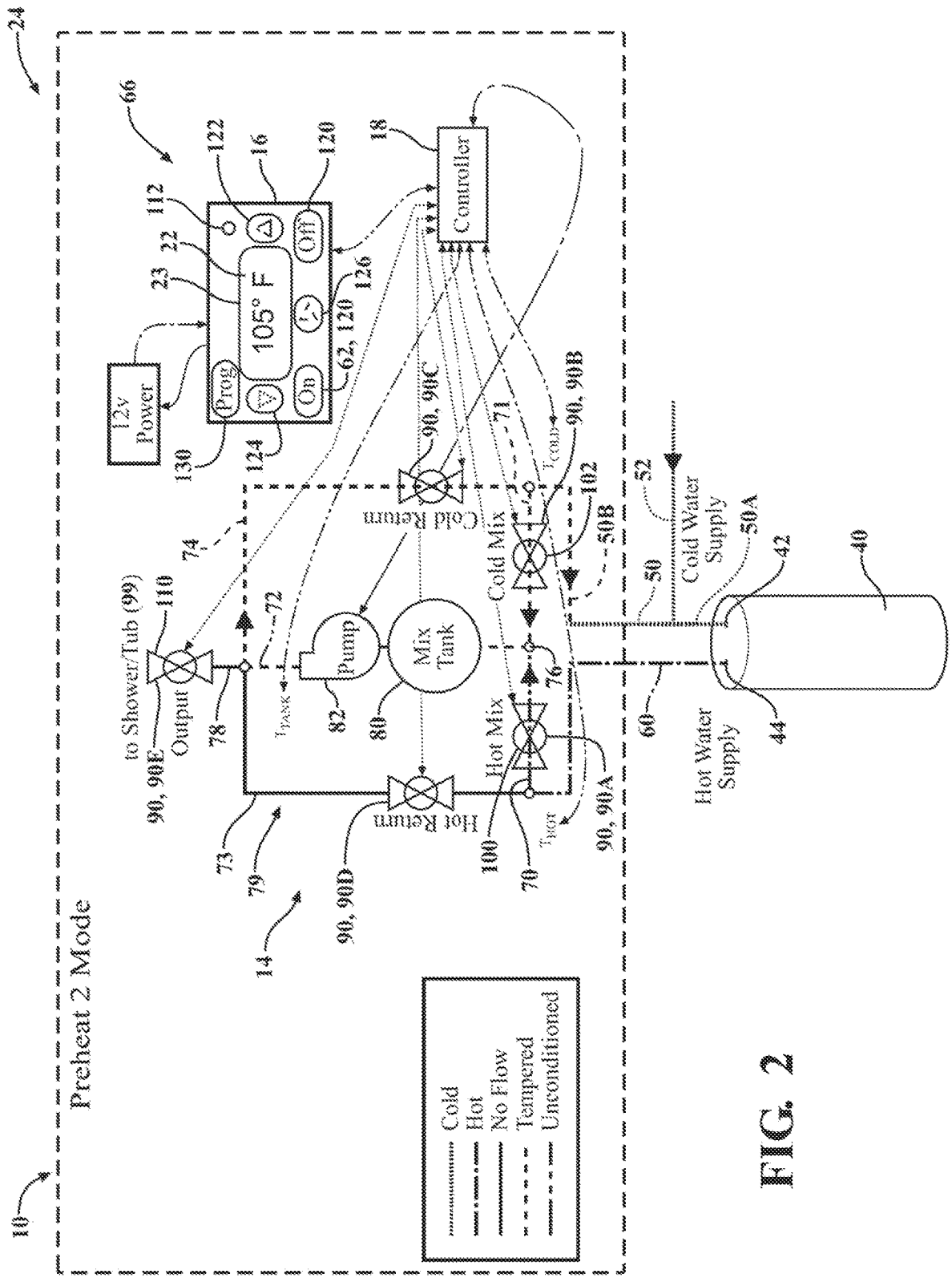
FIG. 2 is a diagrammatic representation of the water preconditioner system in a second pre-heat mode according to one example.

During the second preheat mode 24, as shown in FIG. 2 according to one example, the controller 18 toggles the hot mix valve 90A from the open position to a partially open position. In the partially opened position, the flow of water through the hot water control valve 90A can vary from slightly greater than a 0% flow rate to slightly less than a 100% flow rate as compared to the flow rate of water in the open position or closed position (0% flow rate). At the same time, the controller 18 also toggles the cold mix valve 90B to a partially open position. Collectively therefore, the flow rate of water flowing through the hot and cold water control valves 90A, 90B can be precisely controlled to such that the mixture of water flowing through the mixing tank 80 is set to the preset temperature 22. For example, the water flow rate through the hot mix valve 90A may be set at 30% flow rate, while the water flow rate through the cold mix valve 90B may be set at a 70% flow rate, such that the water flowing through the mixing tank 80 is incrementally increased from the target temperature to the preset water dispensing temperature 22. Still further, the controller 18 toggles the water outlet valve 90E in a bypass position, the cold water return valve 90C to an open position, and the hot water return valve 90D to a closed position. In this example, when the water outlet valve 90E is in the bypass position, the water flow from the outlet of the pump 82 and is directed through the open cold water return valve 90C, the second portion 50B and first portion 50A of the cold water return line 50, and the fluid inlet 42 of the hot water tank 40.

Once the preset water dispensing temperature 22 is reached, the controller 18 is configured to operate the water preconditioner system in the maintain mode 32, as will be described in further detail below.

The precool mode 28 is initiated by the controller 18 when the sensed water temperature by one of the sensors 100, 102 or 110 is greater than the target temperature, and in most cases is greater than the preset water dispensing temperature 22.

Figure 3:
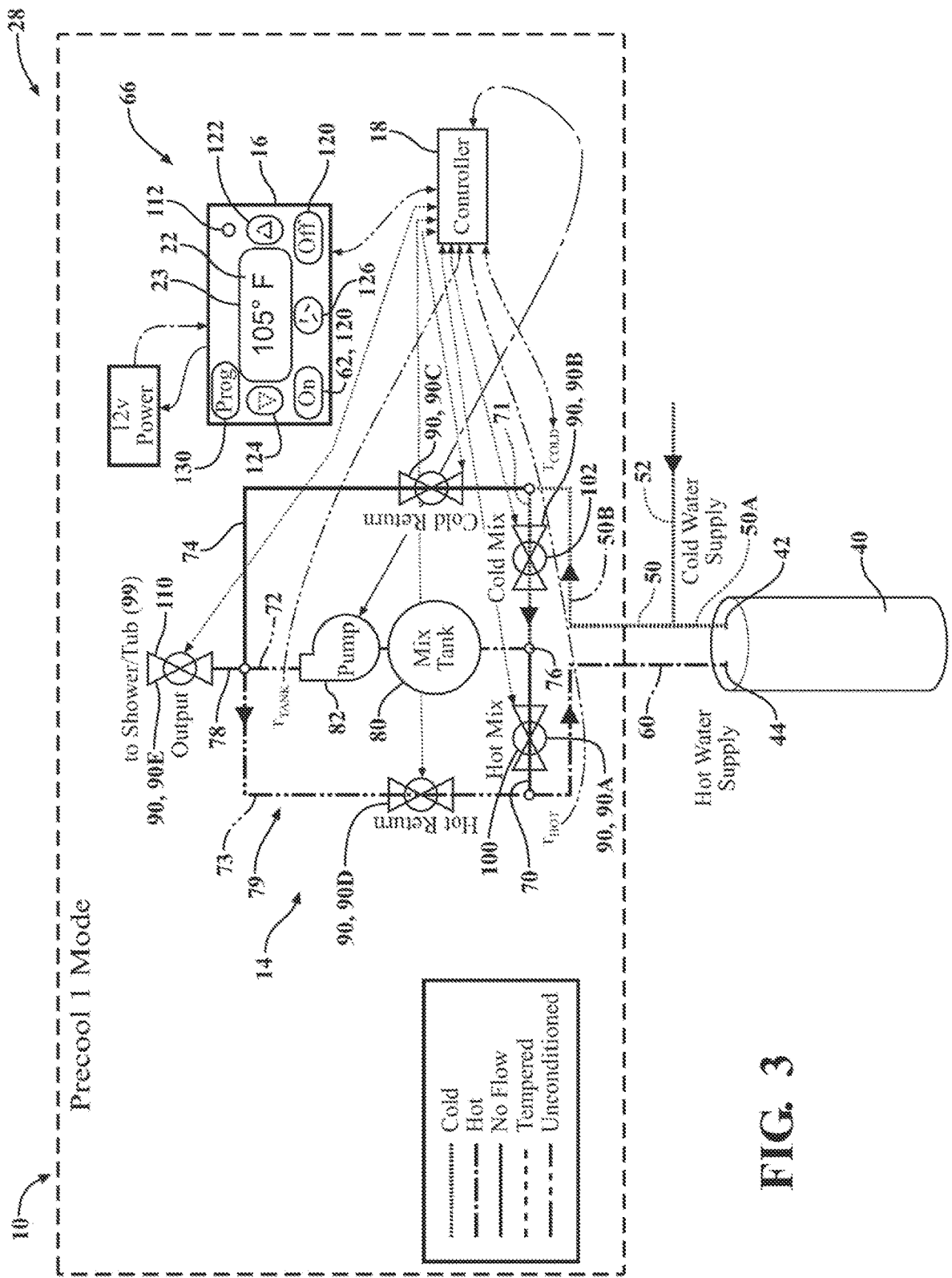
FIG. 3 is a diagrammatic representation of the water preconditioner system of FIG. 1 in a pre-cool mode according to one example.

During the precool mode 28, as shown in FIG. 3 according to one example, the controller 18 toggles the hot mix valve 90A to the closed position, preventing hot water flow into the mixing tank 80. At the same time, the controller 18 toggles the cold mix valve 90B to the open position to allow cold water to flow into the mixing tank 80.

Still further, the controller 18 toggles the water outlet valve 90E in a bypass position, the cold water return valve 90C to a closed position, and the hot water return valve 90D to an open position. In this example, when the water outlet valve 90E is in the bypass position, the water flow from the outlet of the pump 82 and is directed through the open hot water return valve 90D, the hot water supply line 60, and the fluid outlet 44 of the hot water tank 40. The precool mode 26 continues until the water temperature circulating through the mixing tank 80 reaches the target temperature as sensed by one or more of the temperature sensors 100, 102, 110. Once the target temperature is reached, the controller 18 is configured to operate the water preconditioner system 10 in the second preheat mode 24, as described above.

To initiate the controller 18 to operate in the maintain mode 32, in one example, the controller 18 compares the temperature sensed by any one or more of the temperature sensors 100, 102, 110 to the preset water temperature 22 during the second preheat mode 24. If the sensed temperature is equal to the preset water temperature 22, the controller 18 operates in the maintain mode 32. In other words, once the sensed temperature of the water is at the preset water temperature 22, the controller 18 operates in the maintain mode 24.

Figure 4:
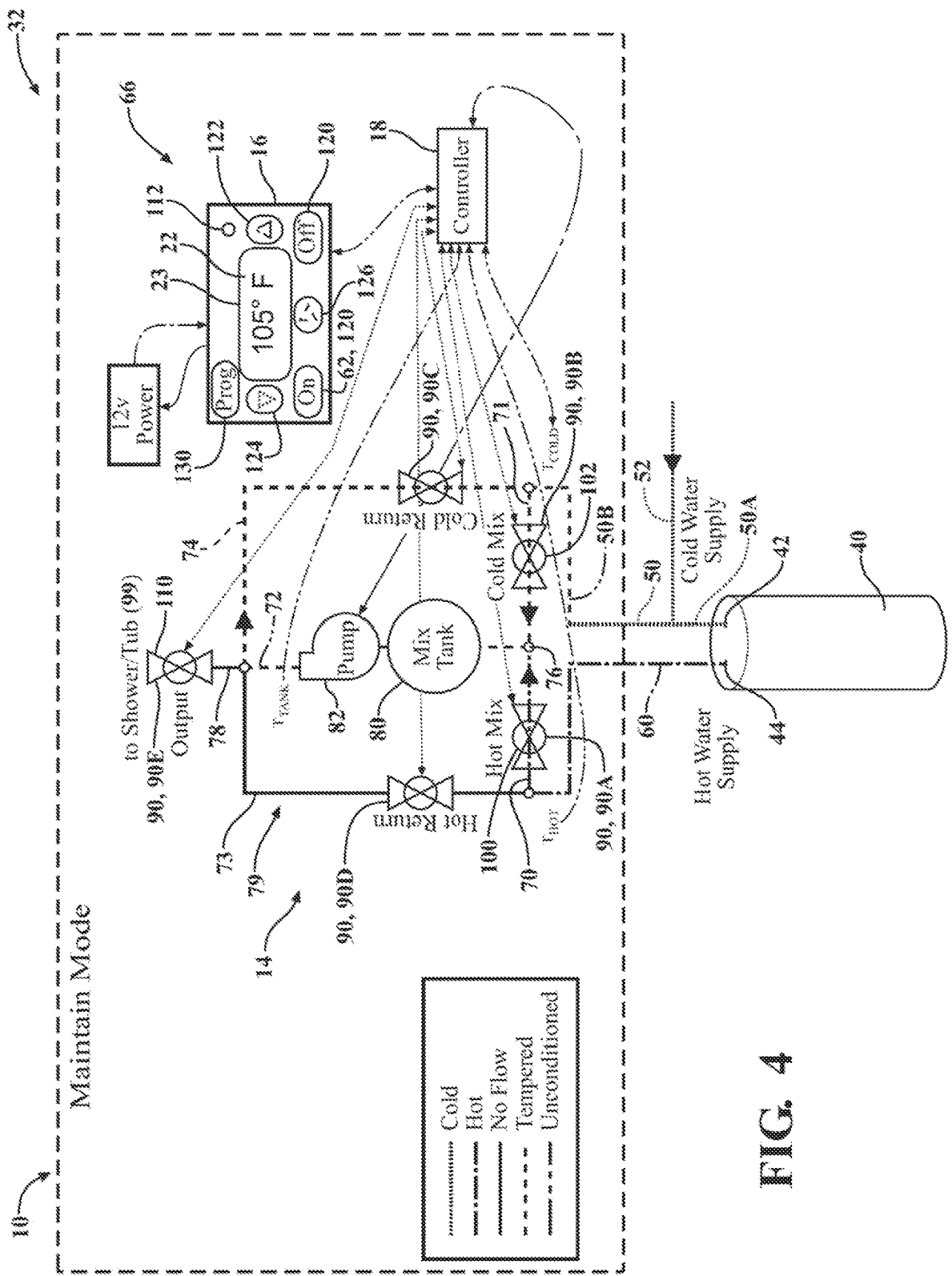
FIG. 4 is a diagrammatic representation of the water preconditioner system of FIG. 1 in a maintain mode according to one example.

During the maintain mode 32, as shown in FIG. 4, when the temperature of the water is at the desired preset water temperature 22, the controller toggles the hot mix valve 90A to a partially open position. In the partially opened position, the flow of water through the hot water control valve can vary from slightly greater than a 0% flow rate to slightly less than a 100% flow rate as compared to the flow rate of water in the open position or closed position (0% flow rate). At the same time, the controller 18 also toggles the cold mix valve 90B to a partially open position. Collectively therefore, the flow rate of water flowing through the hot and cold water control valves 90A, 90B can be precisely controlled to such that the mixture of water flowing through the mixing tank 80 is set to the preset temperature 22. For example, the water flow rate through the hot mix valve 90A may be set at 70% flow rate, while the water flow rate through the cold mix valve 90B may be set at a 30% flow rate, such that the water flowing through the mixing tank 80 is maintained at the preset temperature 22 (shown in FIG. 4 as 105 degrees Fahrenheit).

Due to the continuous nature of the temperature sensing during the maintain mode 32 by one or more of the temperature sensors 100, 102, 110, the controller 18 can toggle the hot water control valve slightly more opened (for example from 70% open to 75% open), and toggle the cold mix valve 90B slightly more closed (for example from 30% open to 25% open to increase the water temperature flowing through the mixing tank 80 if the sensed temperature is below the preset temperature 22. Similarly, the controller 18 can toggle the hot water control valve slightly more closed (for example from 70% open to 65% open), and toggle the cold mix valve 90B slightly more opened (for example from 30% open to 35% open to decrease the water temperature flowing through the mixing tank 80 if the sensed temperature is above the preset temperature 22. Alternatively, the controller 18 can toggle the cold mix valve 90B between the open and closed positions, while maintaining the hot mix valve 90A in the open position, to maintain the temperature of the water at the preset water temperature 22.

Further, during the maintain mode 32, the fluid control valve 90E remains in the bypass position or closed position, respectively, to prevent water from passing to the water outlet 99, but allowing the water to otherwise flow through the mixing tank 80 during the maintain mode 32.

Still further, during the maintain mode 32, when the water temperature as sensed by the one or more temperature sensors 100, 102, 110 (and in particular the water temperature at the pump output 90E as sensed by the third temperature sensor 110) is at the target temperature, the controller 18 may direct that the pump 82 be intermittently turned on and off, and the valves 90A, 90B be intermittently be closed or opened, in order to decrease energy usage while maintaining the water temperature at the target temperature.

However, when the water temperature as sensed by the one or more temperature sensors 100, 102, 110 (and in particular the water temperature at the pump output 90E as sensed by the third temperature sensor 110) falls below the target temperature, the controller 18 directs the pump 82 to be turned on in coordination with the hot and cold water valves 90A, 90B being toggled to the desired degree of openness to return the water temperature to the target temperature. When the target temperature is reached at the pump output 90E as sensed by the third temperature sensor 110, the pump 82 is stopped and the hot and cold water valves 90A, 90B are closed, wherein the pump 82 and valves 90A, 90B may be intermittently opened and closed to maintain the temperature at the target temperature as described above.

To initiate the controller 18 to operate in the water dispensing mode 34, in one example, the controller 18 receives a second user input 66 from the user interface 16. For instance, the user may press the start button 62. In another example, the position of the user is detected to by the proximity sensor 112 to initiate the water dispensing mode 34.

In order for the controller 18 to operate in the water dispensing mode 34, the sensed temperature by the one or more temperature sensors 100, 102, 110 (and preferably the water temperature sensed at the pump output 90E as sensed by the third temperature sensor 110) must be at the preset water temperature 22. It will be appreciated that the user, at any time, may override the system 10.

Figure 5:
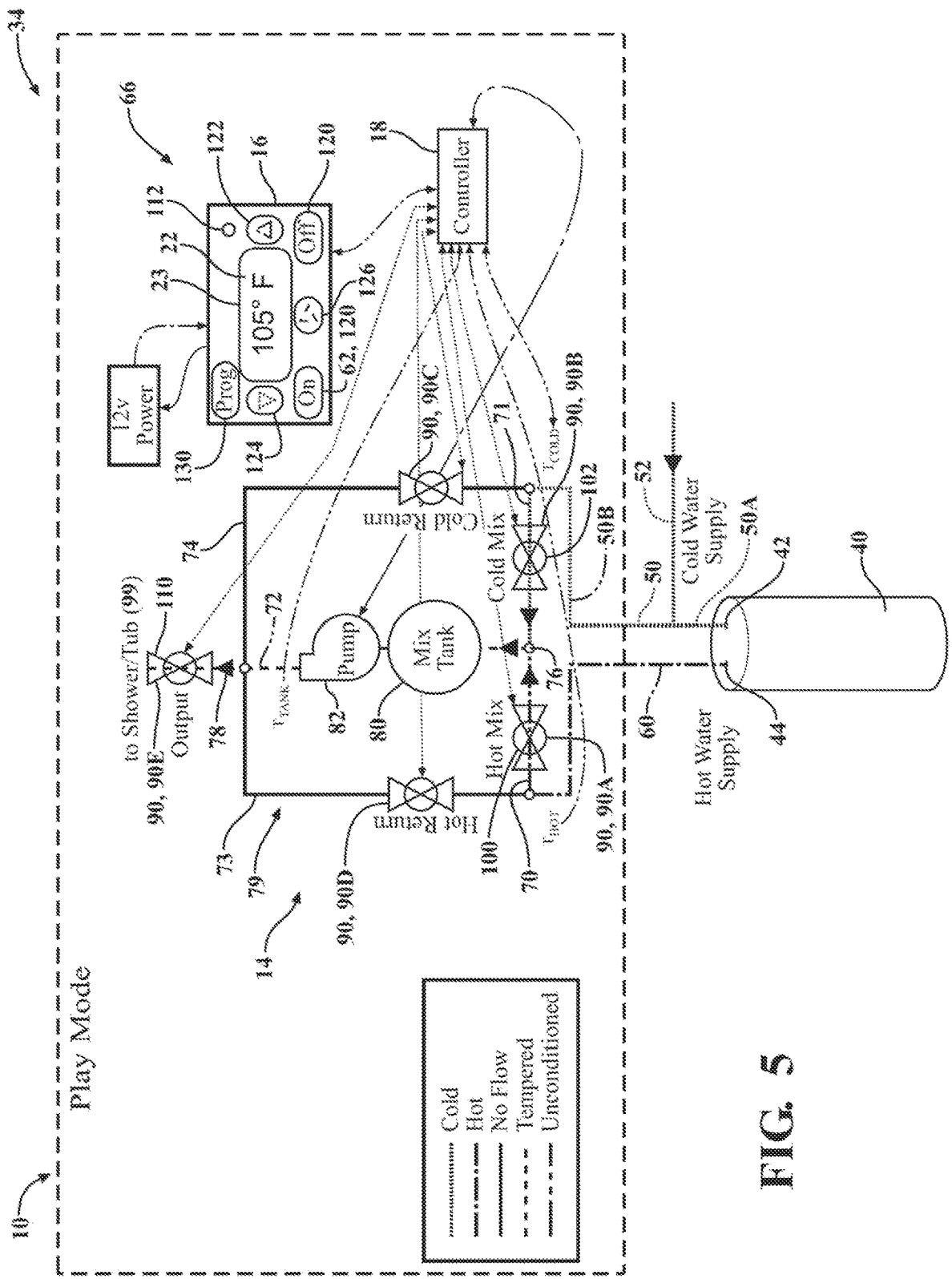
FIG. 5 is a diagrammatic representation of the water preconditioner system of FIG. 1 in a water dispensing mode, or play mode, according to one example.
Figure 6:
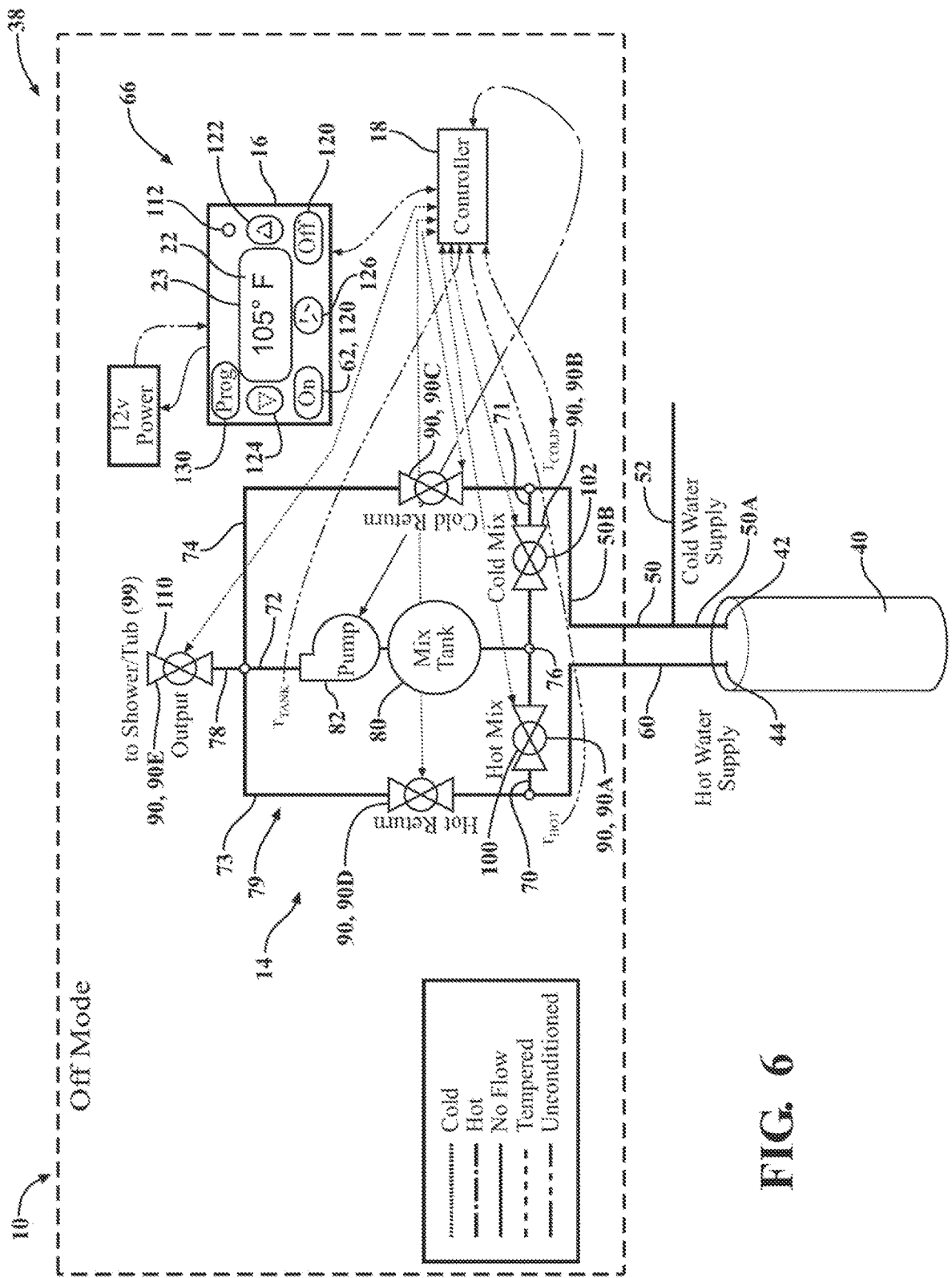
FIG. 6 is a diagrammatic representation of the water preconditioner system of FIG. 1 in an off mode according to one example.

During the water dispensing mode 34, as shown in FIG. 5, the controller 18 toggles the hot mix valve 90A and the cold mix valve 90B between the open and closed positions, or adjusts the hot mix valve 90A and the cold mix valve 90B in one of the respective partially opened positions, as necessary to maintain the sensed temperature of water at the preset water temperature 22. Additionally, during the water dispensing mode 28, the water outlet valve 90E is in the open position such that the flow of water passes through the shower head.

Once the user is finished showering or bathing, the controller 18 may, in one example, receive a third user input 55 from the user interface 16 indicating the controller 18 to operate in the shutdown mode, or off mode 38, wherein the flow of water out of the water outlet 99 is immediately cut off. To initiate the off mode 38, the user may press the off button 120 to signal the controller 18 to operate the water preconditioner system 10 in the off mode 30. In another example, the absence of detection of the user position by the proximity sensor 112 may signal the controller 18 to operate in the off mode 38. In yet another example, the timer coupled to the controller 18 may be preprogrammed to signal the controller 18 to operate in the off mode 38. In the off mode 38, the controller 18 may be configured to inactivate the pump 82 and/or toggle each of the valves 90 to the closed position, therein preventing water flow within the mixing assembly 14.

It will be appreciated that the first, second and third user input 66 may be interchangeable. It will further be appreciated any of the first, second or third user input 66 may be one or more input from the user. For example, the first user input 66 may be the user setting the preset water temperature 22 and pressing the start button 62.

The transition from mode to mode may be defined by signals generated by any of the aforementioned sensors or other hardware located throughout the system 10. It will be appreciated that additional and alternative suitable components, features, configurations, and methods of using the devices, as well as various ways in which the teachings herein may be combined and interchanged, will be apparent to those of ordinary skill in the art in view of the teachings herein.

It will be further appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claiemd is:
1. A water preconditioner system comprising:
a user interface for manually or automatically receiving inputs from the user;
a mixing assembly connected between hot and cold water supply lines, the mixing assembly including a first control valve coupled to the hot water supply line and a second control valve coupled to the cold water supply line, with each of said first and second control valves operable in a closed position and an open position and in at least one partially open position defined between the closed and open position; and a controller in communication with the plurality of control valves and the user interface for controlling the operation of the system, wherein the controller is configured to:
receive a first user input from the user interface indicative of a desired preset water dispensing temperature of water flowing through the mixing assembly;
determine a water temperature of water flowing through the mixing assembly;
operate in a first mode in response to the first user input from the user interface to heat the water flowing through the mixing assembly from the determined water temperature to a target temperature when the determined water temperature is less than the desired preset water dispensing temperature, the target temperature being less than the desired preset water dispensing temperature by a predetermined number of degrees;
operate in a second mode in response to the first user input from the user interface to heat the water flowing through the mixing assembly from the target temperature to the desired preset water dispensing temperature;
operate in a third mode in response to the first user input from the user interface to precool the water flowing through the mixing assembly from the determined water temperature to a target temperature when the determined water temperature is greater than the desired preset water dispensing temperature;
operate in a maintain mode to maintain the temperature of the water flowing through the mixing assembly at the desired preset water dispensing temperature; and
operate in a water dispensing mode to regulate the water flow from the mixing assembly to the user at the desired preset water dispensing temperature;
wherein in the water dispensing mode, the controller toggles a fluid control valve in the open position to regulate the water flow from the mixing assembly to the user at the preset temperature, and
wherein the fluid control valve is in a bypass position in the first, second, third and maintain modes to recirculate the water.

2. The water preconditioner system of claim 1, wherein the system further comprises a proximity sensor for detecting the presence and position of the user.

3. The water preconditioner system of claim 2, wherein the controller operates in the first mode in response to the detection of the user.

4. The water preconditioner system of claim 1, wherein in the first mode, the controller toggles the first control valve to the open position and the second control valve to the closed position to adjust the temperature of the water flowing through the mixing assembly to the target temperature.

5. The water preconditioner system of claim 1, wherein in the second mode, the controller toggles the first control valve and the second control valve to a respective one of the at least one partially open positions to preheat the mixing assembly from the target temperature to the desired preset temperature.

6. The water preconditioner system of claim 1, wherein in the third mode, the controller toggles the first control valve to the closed position and the second control valve to the open position to adjust the temperature of the water flowing through the mixing assembly to the target temperature.

7. The water preconditioner system of claim 1, wherein in the maintain mode, the controller toggles the first control valve and the second control valve to a respective one of the at least one partially open positions to maintain the mixing assembly at the preset temperature.

8. The water preconditioner system of claim 1, wherein the user interface includes:
a control button to switch the system on and off,
a temperature increase control button that allows the user to increase the desired preset water dispensing temperature,
a temperature decrease control button that allows the user to decrease the desired preset water dispensing temperature, and
a start button to initiate water flow.

9. The water preconditioner system of claim 8, wherein the mixing assembly further comprising a pump in communication with the controller configured to recirculate and/or pump the water and deactivate recirculation and/or pumping in response to the comparison.

10. The water preconditioner system of claim 8, wherein the user interface is configured to produce a visual, audio, and/or haptic feedback based on the controller comparing the temperature sensed and the preset temperature.

11. The water preconditioner system of claim 1, wherein the system further comprises a temperature sensor coupled to the mixing assembly for detecting the temperature of water in the mixing assembly in each of the first, second, third, maintain and water dispensing modes.

12. The water preconditioner system of claim 11, wherein the controller is further configured to compare the temperature sensed by the temperature sensor and the desired preset water temperature and operate in one of the first, second, third, maintain and water dispensing modes.

13. The water preconditioner system of claim 1, wherein the controller is further configured operate in an off mode in response to the first user input from the user interface to prevent water flow within the mixing assembly.

* * * * *